CURRENT SWITCHING TRANSISTOR SYSTEM UTILIZING TUNNEL DIODE COUPLING

Filed Aug. 4, 1961

INVENTOR.
PHILIP SPIEGEL
BY
Fordyce A. Bothwell
ATTORNEY 3,176,152

CURRENT SWITCHING TRANSISTOR SYSTEM UTILIZING TUNNEL DIODE COUPLING

Philip Spiegel, Lansdale, Pa., assignor, by mesne assignments, to Philco Corporation, Philadelphia, Pa., a corporation of Delaware Filed Aug. 4, 1961, Ser. No. 129,412
4 Claims. (Cl. 307—88.5)

This invention relates to non-saturated transistor current switching devices, and more particularly to cascade arrangements of such devices.

As is well known, in such a device current from a common source is switched selectively into either of a pair of circuit branches, each including a transistor, by turning one transistor on and the other off. Such devices are characterized by their rapidity of operation and they are commonly employed in equipment such as high-speed digital computer equipment.

In many instances it is desired to employ two or more such devices connected in cascade. In the cascading of such devices, it is generally desirable to employ similar devices and as few voltage supplies as possible, particularly where large scale fabrication of equipment is involved. This has been accomplished in the past by employing Zener diode voltage translation networks in the collector circuits of the transistors. However, such networks dissipate considerable power and this has presented a problem in the cascading of the current switching devices.

The principal object of the present invention is to provide a satisfactory solution of this problem, i.e., to provide in such a cascade system a voltage translation arrangement which does not dissipate a significant amount of power.

Another object of the invention is to provide such an arrangement which does not detract in any way from the high-speed operation of the system.

I have found that the aforementioned desired cascading of the current switching devices can be achieved, without significant added power dissipation, by utilizing tunnel diodes to couple the cascading devices. More particularly I have found that a series combination of a tunnel diode and a resistor acting as a monostable switch can be utilized to effect voltage translation in the cascade system without significant added power dissipation.

In accordance with this invention, in a cascade system employing similar successive stages, the collector circuit of each transistor of each stage serving to drive a following stage is coupled to the base-emitter circuit of a transistor of the following stage through a series combination of a tunnel diode and a resistor acting as a monostable switch.

The invention may be fully understood from the following detailed description with reference to the accompanying drawing wherein—

Figure 1:
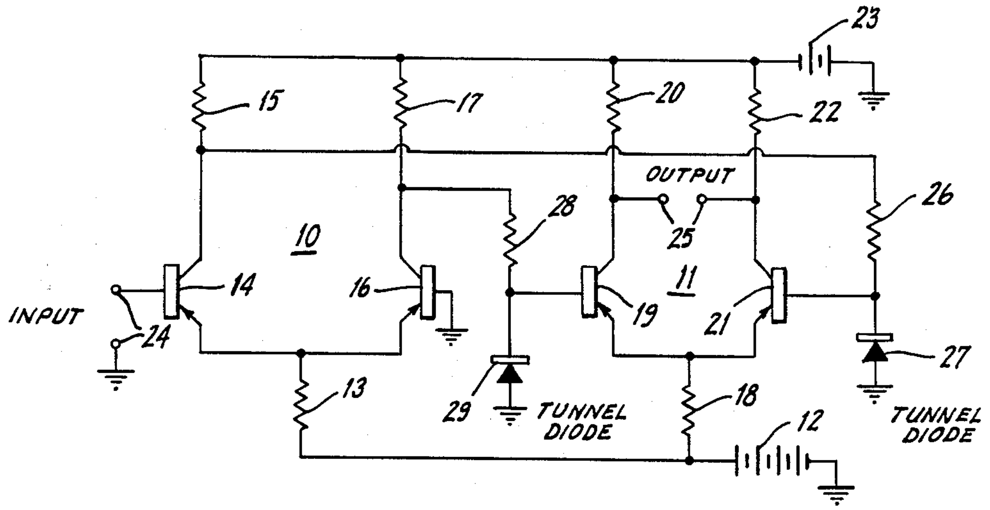
Figure 2:
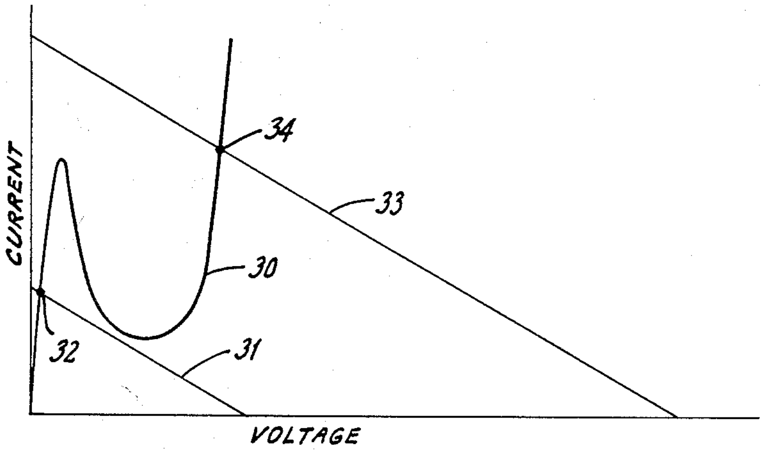

FIG. 1 is a schematic diagram of a cascade current switching system embodying the present invention; and FIG. 2 is an explanatory graphic illustration.

Referring first to FIG. 1, there are shown similar first and second current switching stages 10 and 11 which are connected in cascade. In each of these stages current from a constant-current source is selectively switched into two circuit branches. Thus in stage 10 current from a constant-current source comprising battery 12 and series resistor 13 is selectively switched into circuit branches which include respectively transistor 14 and its load resistor 15 and transistor 16 and its load resistor 17. Similarly in stage 11 current from a constant current source comprising battery 12 and series resistor 18 is selectively switched into circuit branches which include respectively transistor 19 and its load resistor 20 and transistor 21 and its load resistor 22. A collector voltage source 23 is common to the cascaded stages.

In the system illustrated the base of transistor 16 is connected to ground and an input signal is applied to transistor 14 via the input terminals 24. The output signal is derived via the output terminals 25 connected to the collectors of transistors 19 and 21.

In accordance with this invention the cascading of the successive stages is effected through interconnections each of which includes a series combination of a tunnel diode and a resistor. Thus in the embodiment shown one of the interconnections comprises the series combination of resistor 26 and tunnel diode 27 connected between the collector of transistor 14 and ground, with the junction between the resistor and the diode connected to the base of transistor 21. Similarly the other interconnection comprises the series combination of resistor 28 and tunnel diode 29 connected between the collector of transistor 16 and ground, with the junction between the resistor and the diode connected to the base of transistor 19. Furthermore the value of each of the resistors 26 and 28 is chosen for monostable operation of the associated tunnel diode.

Referring to FIG. 2 there is shown the voltage-current characteristic 30 of each tunnel diode, and the value of each of the resistors 26 and 28 is chosen so that its load lines intersects the characteristic 30 at only one point. By way of example, the resistor load line may be that shown at 31 which intersects the characteristic 30 only at point 32, or the resistor load line may be that shown at 33 which intersects the characteristic 30 only at point 34.

By way of example, in one embodiment of the invention as shown in FIG. 1 for use as a high-speed square wave generator the components are as follows:

| | | |
|---|---|---|
| Source 12 | volts | +64 |
| Source 23 | do | −11 |
| Transistors 14 and 16 | | 2N1126 |
| Transistors 19 and 21 | | 2N768 |
| Tunnel diodes 27 and 29 | | L5606 |
| Resistor 13 | kilohms | 1 |
| Resistors 15 and 17 | ohms | 150 |
| Resistor 18 | kilohms | 33 |
| Resistors 20 and 22 | do | 1 |
| Resistors 26 and 28 | do | 10 |

In operation of the circuit as a square wave generator a 40 kc. sine wave, 4 volts peak to peak, was applied to the input. In operation the current switching stages operate in the usual manner since these stages are conventional, the novel feature being the cascading of the stages through the resistor-tunnel diode arrangements. Thus in the case of stage 10 either transistor 14 or transistor 16 conducts depending on which transistor base has the more negative potential. During positive portions of the input sine wave, the base of transistor 16 has the more negative potential and it conducts while transistor 14 is off. During negative portions of the input sine wave, the base of transistor 14 has the more negative potential and it conducts while transistor 16 is off.

When transistor 16 conducts and transistor 14 is off, tunnel diode 29 is driven to the high voltage state while condition obtains when transistor 14 conducts and trantunnel diode 27 is supporting a low voltage. The reverse condition obtains when transistor 14 conducts and transistor 16 is off.

The driven current switching stage 11 operates in conventional manner according to which transistor base has the more negative potential, and hence the transistors 19 and 21 are rendered alternately conductive. The result is that a square wave output is produced across the output terminals 25.

The purpose of the tunnel diodes and their associated resistors 26 and 28 is to effect the necessary voltage translation without objectionable power dissipation as in prior voltage translation networks employing Zener diodes. The necessity for voltage translation in such a cascade system is well known in the art.

Tests have shown that the total power dissipation of a cascade system constructed according to this invention is less than one-half of that of a similar system employing Zener diode voltage translation networks. In the system employing the Zener diode networks each such network includes the Zener diode and two bias resistors which dissipate a relatively large amount of power. On the other hand in the system according to this invention the tunnel diodes do not dissipate any appreciable power and the resistors associated with the diodes dissipate only a very small amount of power.

While in the system illustrated there are only two cascaded stages, it will be understood that any number of such stages may be employed, with each pair of consecutive stages coupled in accordance with this invention. Thus in the case of a three-stage system the second and third stages would be coupled in the same way that first and second stages are coupled as in the illustrated system, and the output signal would be derived from the third stage.

Furthermore while a specific form of coupling has been illustrated as an embodiment of the invention, it will be understood that the invention is not limited thereto but contemplates such modifications and further embodiments as may occur to those skilled in the art.

I claim:

1. In a current switching transistor system, at least two cascaded current switching stages, each of said stages including a pair of transistors connected in parallel relation with one another, a constant current source connected to the emitters of said transistors, signal input means connected to the first of said stages for controlling the current switching action therein, and means for controlling the current switching action in the second of said stages comprising coupling means between the respective outputs of the transistors of the first stage and the respective inputs of the transistors of the second stage, each of said coupling means including a resistor and a tunnel diode, said resistor being of a value such that it and said diode operate as a monostable switch.

2. In a current switching transistor system, at least two cascaded current switching stages, each of said stages including two parallel circuit branches each comprising a transistor having an emitter, a base and a collector, and a collector load resistor connected between the collector of the transistor of that branch and a point of bias potential; a constant current source having one terminal connected to the emitter of both of said transistors and a second terminal connected to a point of reference potential; signal input means coupled to the base of one of said transistors in the first of said cascaded stages for controlling the switching action therein; and means for controlling the current switching action in the second of said stages comprising a first monostable tunnel diode switch means the input terminal of which is connected to an intermediate point on one of said circuit branches of said first cascaded stage and the output of which is connected to the base of one of said transistors of said second cascaded stage, and a second monstable tunel diode switch means the input terminal of which is connected to an intermediate point on the other of said circuit branches of said first cascaded stages and the output of which is connected to the base of the other of said transistors in said second cascaded stage.

3. In a current switching transistor system, at least two cascaded current switching stages, each of said stages including two parallel circuit branches each comprising a transistor having an emitter, a base and a collector, and a collector load resistor connected between the collector of the transistor of that branch and a point of bias potential; a constant current source having one terminal connected to the emitter of both of said transistors and a second terminal connected to a point of reference potential; signal input means coupled to the base of one of said transistors in the first of said cascaded stages for controlling the switching action therein; and means for controlling the current switching action in the second of said stages comprising a first resistor and a first tunnel diode serially connected between an intermediate point on one circuit branch of said first cascaded stage and a point of fixed reference potential, means connecting the junction of said first resistor and said first tunnel diode to the base of one of said transistors in the second cascaded stage, a second resistor and a second tunnel diode serially connected between an intermediate point of the other circuit branch of said first cascaded stage and a point of fixed reference potential, and means connecting the junction of said second resistor and said second tunnel diode to the base of the other transistor in said second cascaded stage, each of said first and second resistors having a value such that it and its associated diode operates as a monostable switch.

4. In a current switching transistor system, at least two cascaded current switching stages, each of said stages including two parallel circuit branches each comprising a transistor having an emitter, a base and a collector, and a collector load resistor connected between the collector of the transistor of that branch and a point of bias potential; a constant current source having one terminal connected to the emitter of both of said transistors and a second terminal connected to a point of reference potential; signal input means coupled to the base of one of said transistors in the first of said cascaded stages for controlling the switching action therein; means connecting the base of the other transistor in the first stage to a point of fixed reference potential; and means for controlling the current switching action in the second of said stages comprising a first resistor and a first tunnel diode serially connected between the collector-load resistor junction of one circuit branch of said said first cascaded stage and a point of fixed reference potential, means connecting the junction of said first resistor and said first tunnel diode to the base of one of the transistors in the second cascaded stage, a second resistor and a second tunnel diode serially connected between the collector-load resistor junction of the other circuit branch of said first cascaded stage and a point of fixed reference potential, and means connecting the junction of said second resistor and said second tunnel diode to the base of the other transistor in said second cascaded stage, each of said first and second resistors having a value such that for either switching state of said first cascaded stage its load line intersects the voltage-current characteristic of its associated tunnel diode at only one point so as to provide monostable switch operation.

References Cited by the Examiner

UNITED STATES PATENTS

| | | | |
|---|---|---|---|
| 2,930,982 | 3/60 | Patterson | 330—69 |
| 3,015,074 | 12/61 | Taskett | 330—69 |
| 3,102,209 | 8/63 | Pressman | 307—88.5 |

OTHER REFERENCES

Pub. 1—IBM Technical Disclosure Bulletin, vol. 3, No. 6, November 1960.

Pub. II—Fairchild Silicon Transistors Data Sheet No. SL-42/1, March 1961.

ARTHUR GAUSS, *Primary Examiner.*

GEORGE N. WESTBY, *Examiner.*